United States Patent [19]

Blaurock et al.

[11] Patent Number: 4,564,993
[45] Date of Patent: Jan. 21, 1986

[54] DOUBLE NUT AND METHOD OF FORMING THE DOUBLE NUT

[75] Inventors: Günter Blaurock, Niederwerrn; Ernst Albert, Sand/Main; Werner Blaurock, Niederwerrn; Benno Peichl, Bergrheinfeld; Klaus Reichert, Bad Kissingen-Garitz; Hans-Georg Stender, Hambach; Rudolf Schlereth, Frauenroth, all of Fed. Rep. of Germany

[73] Assignee: Deutsche Star Kugelhalter GmbH, Schweinfurt, Fed. Rep. of Germany

[21] Appl. No.: 471,193

[22] Filed: Mar. 1, 1983

[30] Foreign Application Priority Data

Mar. 2, 1982 [DE] Fed. Rep. of Germany ....... 3207566

[51] Int. Cl.⁴ .............................................. B23P 11/00
[52] U.S. Cl. ..................................... 29/434; 29/445; 29/446; 29/458; 29/525; 29/526 R; 74/424.8 R; 411/224; 411/225
[58] Field of Search ...................... 29/525, 434, 526 R, 29/445, 446, 458; 411/224, 225, 223, 315, 319, 291, 274, 258; 74/424.8 R, 424.8 A

[56] References Cited

U.S. PATENT DOCUMENTS

| | | | |
|---|---|---|---|
| 291,039 | 1/1884 | Edgell | 411/224 X |
| 1,539,213 | 5/1925 | Shaw | 411/224 |
| 2,198,167 | 4/1940 | Harman | 29/526 R |
| 2,409,969 | 10/1946 | Williams | 411/225 X |
| 2,651,554 | 9/1953 | Recknagel | 29/526 R X |
| 3,170,691 | 2/1965 | Pritchard | 29/445 X |
| 3,350,768 | 11/1967 | Meylan et al. | 29/525 X |
| 3,479,897 | 11/1969 | Holthofer | 74/424.8 R X |
| 3,820,213 | 6/1974 | Kent | 29/445 X |
| 4,369,011 | 1/1983 | Ploss | 74/424.8 R X |

FOREIGN PATENT DOCUMENTS 725181 9/1942 Fed. Rep. of Germany .
6600506 6/1967 Fed. Rep. of Germany .
1255401 6/1968 Fed. Rep. of Germany .
1930399 1/1970 Fed. Rep. of Germany .
1934840 2/1970 Fed. Rep. of Germany .
1936546 1/1971 Fed. Rep. of Germany .
2038699 4/1971 Fed. Rep. of Germany .
2128994 6/1971 Fed. Rep. of Germany .
2007380 8/1971 Fed. Rep. of Germany .
2051413 9/1971 Fed. Rep. of Germany .
2133137 4/1972 Fed. Rep. of Germany .
2349958 4/1974 Fed. Rep. of Germany .
2360972 6/1975 Fed. Rep. of Germany .
2062521 9/1975 Fed. Rep. of Germany .
2458340 4/1976 Fed. Rep. of Germany .
2062549 7/1976 Fed. Rep. of Germany .
2135812 12/1976 Fed. Rep. of Germany .
2533996 2/1977 Fed. Rep. of Germany .
2546109 4/1977 Fed. Rep. of Germany .
7708184 7/1977 Fed. Rep. of Germany .
2328910 2/1978 Fed. Rep. of Germany .
2453635 10/1979 Fed. Rep. of Germany .
2940762 4/1981 Fed. Rep. of Germany .

Primary Examiner—Charlie T. Moon
Attorney, Agent, or Firm—Toren, McGeady, Stanger, Goldberg & Kiel

[57] ABSTRACT

In a screw drive, in particular a ball screw drive, a double nut, formed of a pair of individual nuts, is tightened on a threaded spindle and the individual nuts are secured together against relative rotation by a locking member. The locking member is secured within a radially extending recess formed in and bridging the individual nuts. The locking member can be inserted with a certain amount of play into the recess or borehole and then secured within the recess by a cement or similar material so that it cannot be displaced. Various types of locking members can be used, such as locking bolts or threaded bolts. When the locking member is connected into the recess or ball it prevents any rotation of the individual nuts relative to one another.

10 Claims, 14 Drawing Figures

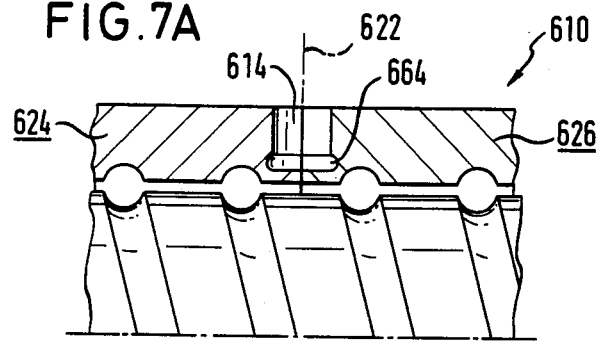
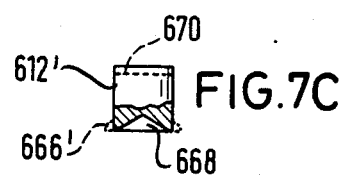
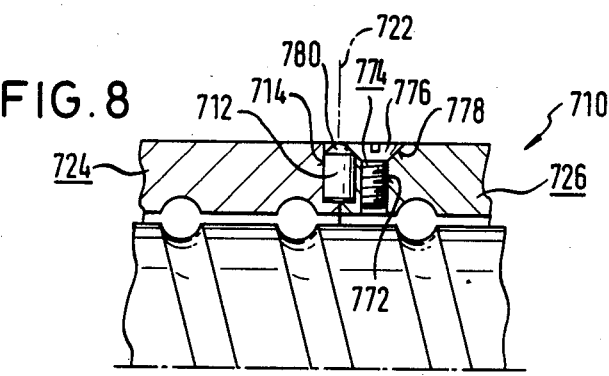
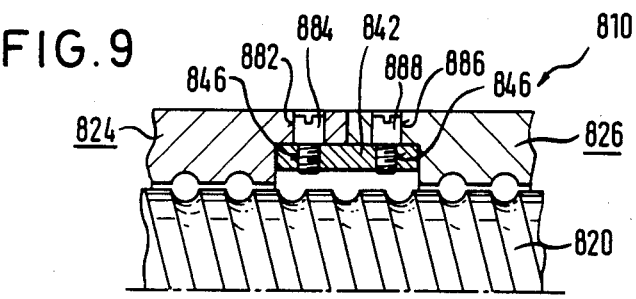

DOUBLE NUT AND METHOD OF FORMING THE DOUBLE NUT

SUMMARY OF THE INVENTION

The present invention is directed to a double nut for use on a threaded spindle and to a method of forming the double nut. The double nut is made up of individual nuts which are rotated relative to one another on the threaded spindle for providing a desired play or for attaining a desired prestress. When the individual nuts are placed in a final position relative to one another they can be secured together by at least a single locking member inserted into the double nut so that it penetrates adjacent recesses in the individual nuts or in adjacent recesses in one of the nuts and an intermediate ring connecting said nuts.

A double nut of this type is disclosed in the German Offenlegungsschrift No. 25 33 996. In this double nut construction all of the recesses are prefabricated before screwing and tightening the individual nuts on the threaded spindle. During tightening, the two individual nuts must be rotated relative to one another by a precise amount so that the two receiving boreholes 12, 13 in these nuts align with a pair of receiving holes 10, 11 in an intermediate ring. Accordingly, only a discontinuous rotational adjustment is possible, though in relatively small steps, since the intermediate ring has a row of receiving hole pairs in various arrangements. One disadvantage of this arrangement is the relatively high costs involved in producing the intermediate ring with the plurality of receiving holes. The same problem exists in the solution disclosed in German Patentschrift No. 24 53 635 in which an intermediate ring 18 is provided with open recess 26a, 26b extending in the axial direction in its two end faces. Two locking bolts 28a, 32a, screwed into the individual nuts each engages, in turn, in one of the prefabricated recesses in the desired rotational position of the nuts. In this arrangement, it must be taken into account during the insertion of the locking bolts that the intermediate ring is correctly oriented relative to the individual nuts. As distinguished from these prior art arrangements, it is the object of the present invention to provide a method which facilitates a rapid and simple continuous rotational adjustment of the individual nuts at low production costs while assuring the locking engagement of the individual nuts by locking members against rotational movement.

In accordance with the present invention, at least one of the recesses or boreholes is formed only after the individual nuts have been rotated on the threaded spindle. Accordingly, the individual nuts can be fixed against one another in a desired rotated position in which at least one recess is formed into which the locking member or bolt is inserted. The quite involved operation of forming a pair of recesses in an intermediate ring overlap with the recesses of the individual nuts is avoided. As a result, only those recesses are needed which eventually will be used for the insertion of the locking members.

In German Offenlegungsschrift No. 29 40 762 it is known to fix the individual nuts against one another in the rotated position with a stopping part having axial fine teeth screwed on to one of the individual nuts and presses against a corresponding member with fine teeth 6 on the adjacent end face of the other individual nut. In this arrangement a continuous rotational adjustment is not possible. The finer the teeth selected to obtain a variety of rotational adjustment possibilities, the greater is the risk that the individual nuts will rotate relative to one another in an undesirable manner during operation. Such a risk does not exist, however, in the protection against rotation by means of locking members disposed in form-locking engagement in recesses.

It is known from the German Gebrauchsmuster No. 77 08 184 to mount a feather key in a groove in one of the two individual nuts so that it is free of play with the feather key extending into a wider groove in the other nut where it can be fastened in different positions by tangentially extending screws. Accordingly, a continuous rotational position adjustment in a relatively small angular area is possible with this known arrangement, however, the production costs are relatively high and this solution is applicable only if the nuts have a relatively large thickness. In many areas in which the invention is applied, however, it is important for the nuts to have the least possible thickness.

Finally, German Offenlegungsschrift No. 23 49 958 discloses a non-rotatable connection between two individual nuts by a closed intermediate ring which contacts an end section of the individual nuts around the outer circumference in a press-fit. The relatively high costs involved in this arrangement, because of the high finishing accuracy required for press-fitting, are especially disadvantageous. If there is insufficient finishing accuracy, there is the risk that the parts fixed against one another in a friction force-locking manner will rotate relative to one another in an undesirable manner during operation. Furthermore, in Offenlegungsschrift No. 23 49 958 a slotted intermediate ring 9 is known which has a changeable diameter for producing a press-fit on both of the individual nuts by means of a tangential screw. In such an arrangement there are the disadvantages of the relatively high costs involved for forming the various parts, the insufficient protection against independent rotation, in certain cases and the additional space requirement in the radial direction.

In accordance with the present invention, after the individual nuts have been rotated into position on the threaded spindle the formation of at least one recess is especially simple when the recess or borehole is drilled radially inwardly from the outside surface. To prevent the locking member from falling out, the recess can be provided with a thread and the locking member can be a threaded bolt screwed into the recess.

In a particularly preferred embodiment of the invention, a radial borehole is produced in the contact plane of the two individual nuts after each individual nut is rotated into the desired position on the threaded spindle and then the locking member or bolt is inserted into the borehole. This recess is provided in each of the individual nuts in a single drilling process. The two part recesses are semicylindrical and combine to form the cylindrical recess or borehole for the locking member. The locking member or bolt fastens the two individual nuts to one another so that an intermediate ring or a housing encompassing the two individual nuts can be dispensed with.

The invention is also directed to a screw drive or worm drive, in particular a ball screw drive, with a threaded spindle and a double nut running on the threaded spindle. The two individual nuts forming the double nut can be rotated relative to one another on the threaded spindle for obtaining a desired play or achieving a desired prestress. The individual nuts can be connected together in a form-locking manner, particularly using the method embodying the present invention. By securing a radially extending locking bolt in a recess formed in the individual nuts it is possible to prevent any independent rotation of one nut relative to the other.

In accordance with the present invention, a partial recess is formed in each of the contacting end faces of the individual nuts so that the partial recesses align opposite one another and form the recess or borehole for the locking member. Such a double nut requires only a few parts, since it is made up of the two individual nuts and at least one locking member or bolt. The part securing the individual nuts together against relative rotation, that is the locking bolt or bolts, is an inexpensive item. A continuous rotational position adjustment is possible if, in accordance with the method of the present invention, at least one of the partial recesses is produced only after the two individual nuts are rotated into position relative one another. The double nut requires little space for insertion in the axial direction, since the locking bolt can be inserted flush with the outer circumferential periphery of the individual nuts. Accordingly, no component is required for protection against rotation which projects outwardly from the circumferential periphery of the nuts. A nut housing is unnecessary. The locking bolt or bolts have a comparatively large diameter and, therefore, afford a form-locking protection against rotation which provides a reliable holding action when radial and axial impacts act on the individual nuts. Together with the locking bolts, the individual nuts pressed against one another at their end faces because of the tightening action in the axial direction, form a mechanically stable double nut arrangement.

It is preferable to form the substantially radially extending partial recesses as substantially semicylindrical recesses. There is the advantage that the partial recesses can be produced at the same time by a single drilling operation in the contact plane of the individual nuts after they have been moved into the desired position.

Based on this embodiment, the two partial nuts can be secured against relative movement in the contact plane by providing several recesses spaced apart in the circumferential direction of the double nut, preferably two or three such recesses.

In another embodiment of the invention, the axes of the two individual nuts are centered, preferably using a centering ring. In this arrangement, a single recess is sufficient for a locking bolt. The centering action prevents radial impact from tending to offset the individual nuts or to swivel the nuts around the single locking bolt.

The locking bolts extend more or less loosely in the corresponding recesses for preventing the two individual nuts from separating from one another, even slightly, in the axial direction during the insertion of the locking bolts which could lead to a change in the pre-stressing and, further, to an arrangement where the axes of the individual nuts are no longer aligned. Accordingly, the locking bolts inserted into the recesses must be protected against loss.

In one embodiment of the present invention, the locking bolt is secured in place by cementing it into the recess. To prevent any loss of the locking bolt under all circumstances, even in the case of a substantially cylindrical locking bolt positioned within a substantially cylindrical recess, it is proposed to provide an undercut in the recess and a corresponding recess in the locking bolt, preferably an annular recess. When the cement fills the recess it provides a locking engagement with the undercut in the recess and with the annular groove in the bolt.

In another embodiment of the present invention, the locking bolt is provided with a threaded section which can be screwed into an intermediate ring or, alternatively, into a centering ring. In this arrangement, the intermediate ring is encircled by each of the individual nuts and the locking bolt is provided with a shoulder at the transition from the threaded section to an adjacent cylindrical section with a larger diameter than the threaded section. The enlarged cylindrical section fills up the recess formed in the individual nuts and secures the position of the intermediate ring. In this embodiment, the double nut offers a closed exterior surface, the screwed-in locking bolt exerts no real forces on either of the individual nuts so that no undesired deformation, such as twisting, tightening or turning, of the individual nuts takes place.

In still another embodiment a securing ring is provided extending around the individual nuts to protect against the loss of the locking bolt. The securing ring is axially displaceable in a circumferential groove formed in the double nut for movement between a first position affording access to the recess and a second position covering the recess. To secure or remove the securing means for the inserted locking bolt, it is only necessary to displace the securing ring in the axial direction. To prevent independent movement of the securing member out of the second end position it is proposed that the securing member or ring be fastened in the second end position on one of the individual nuts in a tightly fitting manner.

It is also possible to provide the securing ring with an opening adapted to the opening of the recess with the ring being displaceable in the circumferential direction of the double nut so that the recess is accessible through the ring opening in a first rotational position and is covered by the ring in a second rotational position. The securing ring can be fixed in the second rotational position by an interlocking engagement, for example, by offsetting a portion of the ring into engagement with one of the individual nuts.

In a further embodiment of the invention, the locking member or bolt is provided on its outside circumference with a shaped portion and the recess is formed with a complementary cut-out portion so that the shaped portion of one engages in the cut-out portion of the other when the locking bolt is inserted. Preferably, the shaped portion of the locking bolt is in the form of a circumferentially extending enlarged portion, such as a flange, and the complementary cut-out in the recess is in the form of an inner circumferential groove. When the locking bolt is inserted, its circumferentially extending enlarged portion projecting outwardly from the outside circumference of the bolt temporarily spreads the two individual nuts apart, however, when the enlarged portion seats within the groove in the recess, the two individual nuts return to the original plane of contact with one another.

An alternative arrangement based on the same general concept involves the provision of a material weakening at the leading or insertion end of the cylindrical locking bolt so that the weakened section becomes displaced outwardly when the bolt is driven into the recess and provides a locking engagement. Due to the material weakening of the leading end of the locking bolt, it is susceptible to heading and the weakening action can be afforded by shaping a hollow cone in the leading end face of the locking bolt.

In still another embodiment of the invention, the locking bolt is held against loss by a securing member which can be screwed into one of the individual nuts. The securing member can be in the form of a securing screw whose head contacts the outer or trailing end of the locking bolt, after it is inserted into the recess, for securing the bolt in place.

Finally, the present invention is directed to a screw or worm drive, in particular a ball screw drive, including a threaded spindle and a double nut running on the threaded spindle and made up of two individual nuts which can be rotated relative to one another on the threaded spindle for obtaining a desired play or a desired prestress. The individual nuts are connectible with one another in a form-locking manner to prevent any independent relative rotation of one with regard to the other. This connection is afforded by at least one substantially radially extending locking bolt disposed in a recess in the individual nuts, in particular using the method embodying the present invention and described earlier, where an intermediate ring is encompassed by the individual nuts and is provided with at least one first recess in radial alignment with a recess in one of the individual nuts and with a second recess in radial alignment with a recess in the other individual nut so that a locking bolt can be inserted into each of the recesses in the individual nuts and threaded into the first and second recesses in the intermediate ring.

It is proposed that the first and second recesses of the intermediate ring be provided with threads for receiving threaded sections of the locking bolts with the recesses in the individual nuts being formed of a continuously cylindrical shape. This arrangement makes it possible to produce the first and/or second recesses in the intermediate ring only after the two individual nuts are already tightened on the threaded spindle. The continuously cylindrically shaped recesses in the individual nuts serve as guides for a drilling tool forming the recesses in the intermediate ring. This particular embodiment is facilitated by forming the ring of a material which is softer than that of the individual nuts.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 7A is another partial detail view, partly in section, similar to FIG. 3 and illustrating another embodiment of the invention;

FIGS. 7B and 7C are elevational views, one partly in section, of locking bolts insertable into the double nut shown in FIG. 7A; and FIGS. 8 and 9 are partial detail views, partly in section, similar to FIG. 3 and each illustrating a further embodiment of the invention.

DETAIL DESCRIPTION OF THE INVENTION

Figure 1A:
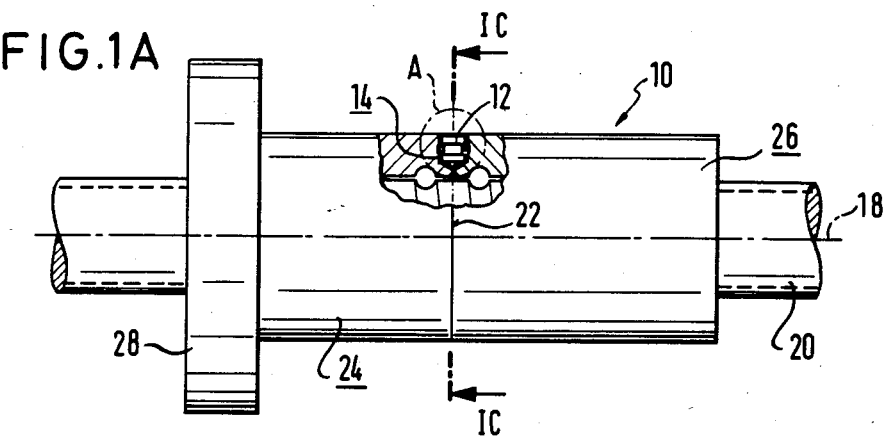
FIG. 1A is a side view of a first embodiment of a double nut incorporating the present invention.

All of the embodiments of the invention displayed in FIGS. 1A through 9 have in common that the two individual nuts of each double nut can be continuously rotated relative to one another on the threaded spindle into a final axial position relative to one another where a desired play, for example, a zero play, or a desired prestress is achieved. The movement of the individual nuts results in a corresponding axially directed compressive stress with the nut threads engaging in the outer thread of the spindle or, in the case of ball threaded nuts, with the running balls in threaded engagement with the nuts and the spindle, so that the compressive stress presses the two individual nuts together. In the desired adjustable rotational position, the individual nuts are secured together in a form-locking manner against any further relative rotation with a receiving recess or borehole for a locking bolt being drilled in the contact plane of the two individual nuts (FIGS. 1A through 8) or a threaded borehole is drilled into an intermediate ring connecting the two individual nuts (FIG. 9). A locking bolt subsequently inserted into the receiving borehole or into the threaded borehole reliably secures the individual nuts against any independent relative rotation. The individual embodiments illustrated in the drawing are distinguished substantially by the manner in which the locking member or bolt, inserted into the receiving borehole, is protected from displacement out of or falling out of the borehole.

Figure 1B:
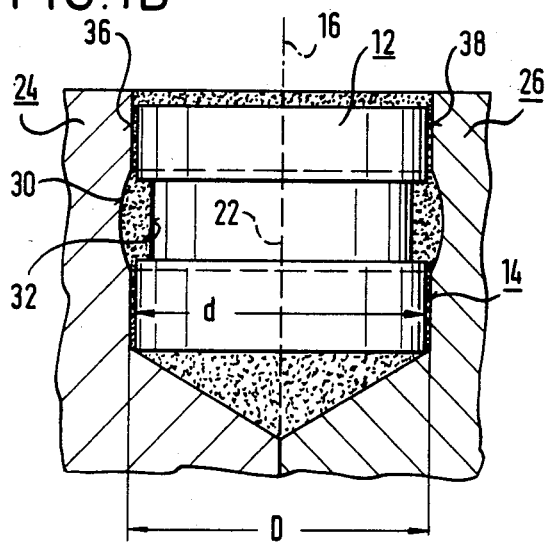
FIG. 1B is an enlarged detail view of the encircled portion A in FIG. 1A.
Figure 1C:
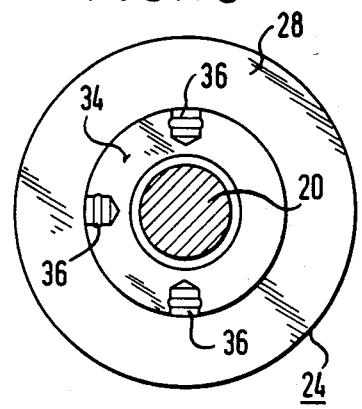
FIG. 1C is a sectional view taken along line IC—IC in FIG. 1A.

In FIGS. 1A through 1C, a double nut 10 is shown with a locking bolt 12 cemented into a receiving borehole 14. As shown enlarged in FIG. 1B, the center line 16 of the borehole 14 extends radially relative to the axis 18 of the threaded spindle 20. Further, the center line 16 is located in the contact plane 22 between the facing end surfaces of the individual nuts 24, 26 making up the double nut 10. In the contact plane 22, the radially extending end surfaces of the two individual nuts 24, 26 are in contact with one another. As indicated in FIG. 1A, the left-hand individual nut 24 includes a fastening flange 28 at the opposite end from the contact plane and this flange provides a connection with a machine element to be moved by the screw drive shown in FIG. 1A. As shown enlarged in the detail view provided in FIG. 1B, the diameter d of the locking bolt 12 is slightly smaller than the diameter D of the cylindrically shaped receiving borehole 14.

In any case, the diameter d is not noticeably larger than the diameter D for preventing any even slight separation of the individual nuts 24, 26 when the locking bolt 12 is inserted into the borehole 14, such separation would change the adjusted tightening or the adjusted play and, in addition, it could cause a slight tilting of the axis of one or the other of the individual nuts 24, 26 relative to the axis 18 of the threaded spindle 20 which would result in increased friction and, accordingly, a reduced efficiency of the arrangement as well as increased wear.

To assure that the locking bolt 12 does not fall out of the borehole 14 during operation of the double nut, despite a loose clearance fit of the locking bolt in the borehole, the locking bolt is fixed in the borehole by means of a cement or cast resin. In particular when cast resin is used, there is the possibility that the locking bolt will disengage in fully cylindrical receiving boreholes 14 or when a fully cylindrically locking bolt is used. The possibility of such displacement is prevented by providing the receiving borehole 14 with an outwardly curved undercut section 30 and by providing the locking bolt with an annular circumferentially extending groove 32 aligned with the undercut section. As a result, the locking bolt cannot fall out, since such displacement would require a deformation of the cast resin in the region of the undercut section 30 and the annular groove 32.

Since, as mentioned above, the receiving borehole 14 is located exactly in the contact plane 16 of the two individual nuts 24, 26, one part of the borehole 14 is formed by a substantially semicylindrical partial recess 36 in the end face 34 of the left-hand individual nut 24, note FIG. 1A with another partial recess 38 aligned axially opposite the partial recess 36 in the adjacent end surface of the right-hand individual nut 26. Each partial recess 36, 38 includes an outwardly curved section spaced inwardly from the outside surface of the individual nut for forming the undercut section 30.

As shown in FIG. 1C, three partial recesses 36 are cut into the end face 34 of individual nut 24 and corresponding partial recesses are formed in the end surface of the individual nut 26 so that three locking bolts can be inserted into the combined partial recesses in the double nut 10. In this arrangement, two of the bolts are located diametrically opposite one another and the third bolt is spaced 90° apart from each of the other two. The three locking bolts assure that the radial forces acting between the individual nuts 24, 26 are absorbed by the bolts and do not lead to any offsetting swiveling action of the individual nuts 24, 26 relative to one another. Therefore, special measures for centering the two individual nuts, such as by a centering ring, need not be taken. Centering without any additional measures can also be achieved if two locking bolts are employed each spaced apart on the double nut periphery at an angle of 90°–120° relative to one another.

Figure 2:
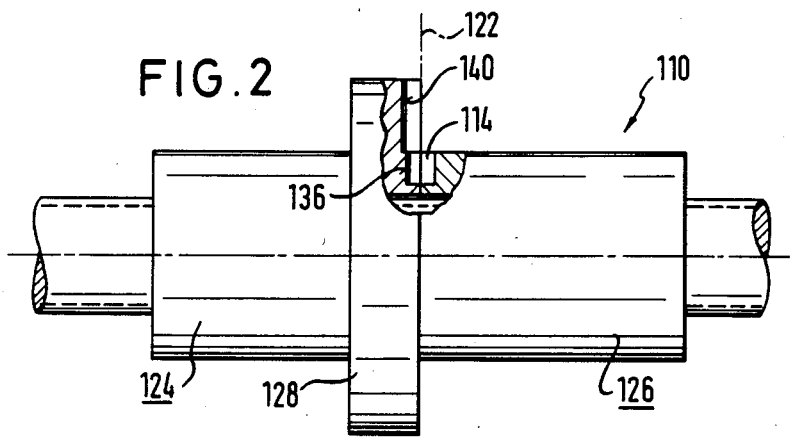
FIG. 2 is a side view, similar to FIG. 1A, of a second embodiment of the present invention incorporated in a double nut.

In FIG. 2 double nut 110 is distinguished from the double nut 10 illustrated in FIGS. 1A to 1C only in that the double nut 110 formed of the individual nuts 124, 126 has the fastening flange 128 located on the right-hand end of the individual nut 124 so that the connection of the individual nuts results at the location of the machine part. Further, in this arrangement, the individual borehole 114 is located exactly on the contact plane 122 of the two individual nuts 124, 126. To facilitate access to the receiving borehole 114, the partial recess 136 in the individual nut 134 is continued radially outwardly in a semicylindrical groove 140 in the surface of the flange 128 so that the groove 140 extends to the radially outer edge of the flange. Groove 140 can be prefabricated to facilitate the formation of the receiving borehole 114, the partial recess 136 in the individual nut 124 is a continuation of the semicylindrical groove 140 in the flange 128. The groove 140 has an enlarged radius compared to the radius of the partial recess 136. The groove 140 can be prefabricated to facilitate the formation of the receiving borehole 114 after the individual nuts 124, 126 have been tightened.

Figure 3:
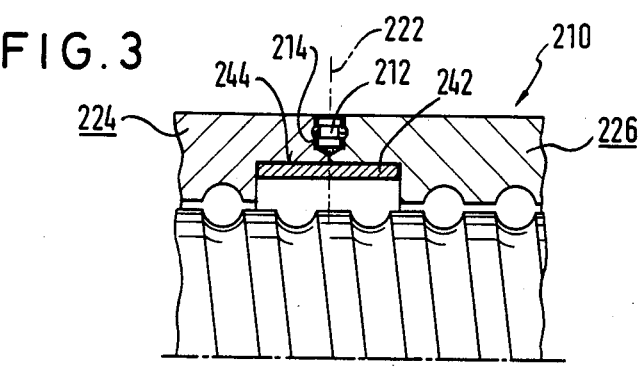
FIGS. 3 to 5 are partial detail views, partly in section, showing three further embodiments of double nuts incorporating the present invention showing the double nuts in the region of the contact plane of the individual nuts forming the double nut.

In the detailed section shown in FIG. 3, a double nut 210 has a centering ring 242 arranged symmetrically relative to the contact plane 222 of the individual nuts 224, 226. Centering ring 242 is seated in an inner circumferential groove 244 located in the inside surface of double nut 210. The interior circumferentially extending groove 244 is formed of two portions, one in each of the individual nuts 224, 226. The portions of the groove 244 are aligned with one another. Centering ring 242 prevents radial movement of the individual nuts 224, 226 in the region of the contact plane 222. The double nut must be protected against relative rotation of the individual nuts after the individual nuts have been rotated into the desired position. Such protection is afforded by a single locking bolt 212 inserted into a receiving borehole 214 located symmetrically relative to the contact plane 222. The borehole 214 is formed after the required rotation of the individual nuts is effected. Centering bolt 212 is shaped in the same manner as the bolt shown in FIG. 1B and it is cemented into the receiving borehole in the same manner as in the borehole shown in FIG. 1B. The bolt 212 is cemented into the borehole 214 to assure that it remains in place.

Figure 4:
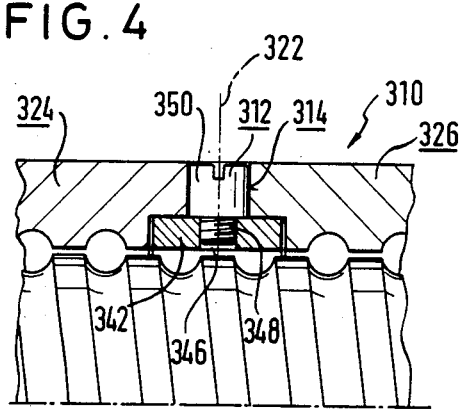

The fixation of the locking bolt 312 in the double nut 310 displayed in FIG. 4 is achieved by an intermediate ring 342 which, like the centering ring 242 in FIG. 3, is inserted symmetrically relative to the contact plane 322 of the two individual nuts 324, 326 in semicylindrically shaped recesses in the individual nuts with the outer surface of the intermediate ring covered by the individual nuts. The intermediate ring 342 is provided in the contact plane 322 with a thread 346 for receiving a corresponding threaded end section of the locking nut 312. As shown in FIG. 4, the locking bolt includes a cylindrical section 350 having a larger diameter than the threaded section 348. When the locking bolt 312 is inserted into the borehole 314 the cylindrical section 350 fills the part of the receiving borehole 314 formed through the individual nuts 324, 326. The upper end face of locking bolt 312, as viewed in FIG. 4, has a screw driver notch in its end face. A multi-edged interior, or the like, can be worked into the end face in place of a engagement surface for a screwing tool for turning the threaded section of the bolt 312 into the threaded section in the intermediate ring 342.

After tightening the two individual nuts 324, 326 by rotation on the threaded spindle, the receiving borehole 314 is formed in the contact plane at any desired circumferential position. Next, the intermediate ring is rotated until the threaded section in it is exactly aligned with the receiving borehole 314 in the individual nuts. The rotation of the intermediate ring can be carried out with the help of a nail which can be extended inwardly through the receiving borehole 314 into contact with the radially outer surface of the intermediate ring 342. It is also possible, however, to form the receiving borehole 314 and the threaded section 346 after tightening the two individual nuts 324, 326.

The inserted locking bolt 312 contacts the outside surface of the intermediate ring 342 with a shoulder formed between the threaded section 348 and the larger diameter cylindrical section 350 so that radial forces are not exerted on the individual nuts by the locking bolt in threaded engagement with the intermediate ring. Intermediate ring 342 can, at the same time, serve as a centering ring, such as ring 242 in FIG. 3, so that a single locking bolt 312 is sufficient.

Figure 5:
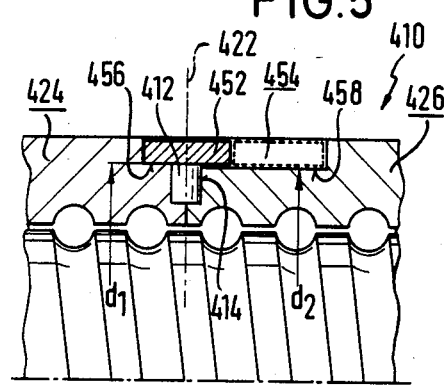

In the double nut 410 illustrated in FIG. 5, the locking bolt 412 is inserted with a loose or clearance fit in a blind receiving borehole 414 located in the contact plane 422. The borehole 414 is formed after the required tightening of the individual nuts 424, 426 is carried out. To prevent the locking nut 412 from falling out of the borehole 414, a securing ring 452 is inserted into a circumferentially extending groove 454 formed in the outside surface of the double nut 410. The groove 454 includes the contact plane 422 of the individual nuts. The groove 454 is made up of two separate sections, 456, 458, the section 456 is located in the individual nut 424 and the section 458 in the individual nut 426. The diameter of the bottom of the groove section 456 outwardly from the axis of the spindle is slightly greater than the diameter of the bottom of the groove section 458. The axial length of the groove 454 made up of the groove sections 456, 458 is approximately twice the axial length of the ring 452 so that the ring is axially displaceable between a securing end position, shown in solid line in FIG. 5 and a releasing end position displayed by a broken line. In the securing end position the receiving borehole 414 is covered by the ring 452 and in the releasing position the receiving borehole is uncovered. In the releasing position the ring 452 is freely movable in the groove section 458, since this section has a smaller diameter base than the other groove section 456. In the securing position, a tight fit exists between the inside surface of the ring 452 and the base of the groove section 456 located in the individual nut 424. The slight difference in dimension between the $d_1$ and the diameter $d_2$ permits the movement of the ring in the groove section 458 while it secures a tight fit for the ring in the groove section 456.

Accordingly, after the rotational adjustment of the individual nuts 424, 426, only the blind receiving borehole 414 needs to be formed in the contact plane 422. After the cylindrical locking bolt 412 is inserted into the borehole with the securing ring located in the broken line position shown in FIG. 5, the locking bolt is secured by axially displacing the securing ring from its releasing position into its securing position shown in full lines in FIG. 5. With accuracy requirements which are not too strict, the securing ring 452 can also serve as a centering ring so that only a single locking bolt is necessary.

Figure 6A:
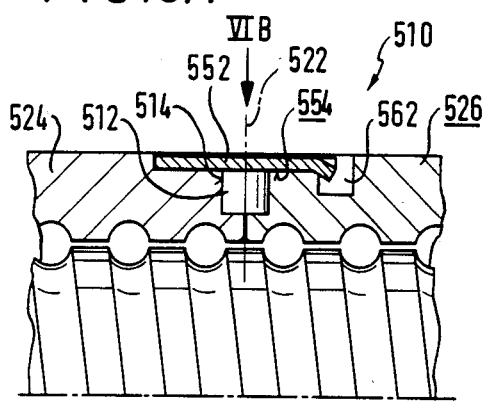
FIG. 6A is a detailed partial view, partly in section, similar to FIG. 3 and illustrating another embodiment of the present invention taken along the line VIA—VIA in FIG. 6B.
Figure 6B:
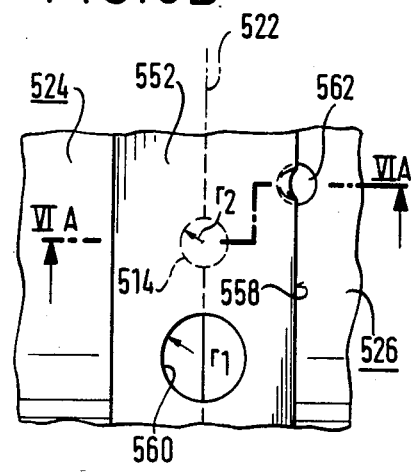
FIG. 6B is a plan view of the double nut shown in FIG. 6A taken in the direction of the arrow VIB in FIG. 6A.

In FIGS. 6A and 6B a double nut 510 is shown and it is distinguished from the double nut 410 shown in FIG. 5 only in that the locking bolt 512 inserted in the blind receiving hole 514 is held in place by a securing ring 552 displaceable in the circumferential direction about the double nut. In this arrangement, the width of the circumferential groove 554 is symmetrical to the contact plane 522 and the width of groove 554 corresponds to the width of securing ring 552. As shown in FIG. 6B, securing ring 552 has a circular opening 560 symmetrical to the contact plane 522. Radius $r_1$ of the opening 560 is greater than the radius $r_2$ of the receiving borehole 514. If the center of the opening 560 is located in exact alignment with the center of the receiving borehole 514, then the borehole is freely accessible. If the ring 552 is rotated into the position shown in FIG. 6B after the locking bolt 512 has been inserted into the borehole 514, the ring holds the locking bolt in place so that it cannot fall out. To secure the ring 552 against rotation after the bolt has been set in place, a shallow cylindrical bore 562 is drilled in the outside surface of the individual nut 526 along the edge 558 of the groove 554 so that it extends partially into the groove 554, then a part of the bore 562 is covered by the corresponding edge of the ring. After the required adjustment of the individual nuts 524, 526 of the double nut 510 is achieved, the opening 560 in the ring 552 is aligned with the receiving borehole and the locking bolt or pin 512 is inserted, the ring 552 is rotated through the groove 554 until the ring covers the borehole 514 and the inserted pin 512. Next, the ring 552 is secured in position by displacing a portion of the edge of the ring 552 into the cylindrical bore 562, note FIG. 6B.

In FIG. 7A, a double nut 610 is illustrated having a blind receiving borehole 614 arranged symmetrically on the contact plane 622. The base of the blind borehole 614 has an undercut section 664 extending around the inner circumference of the borehole. Accordingly, the locking bolt 612 inserted into the borehole 614, as shown in FIG. 7B, has a radially enlarged section 666 extending around the circumference at one end of the bolt. After the individual nuts 624, 626 of the double nut 610 are tightened, the cylindrical receiving borehole 614 is formed along with its undercut section 664 and, subsequently, the locking bolt 612 is driven into the borehole 614 with its enlarged section 666 at its leading end. As the bolt 612 moves inwardly into the borehole 614, the individual nuts 624, 626 are temporarily forced apart by the enlarged section 666 until that section finally seats in the undercut section 664. With the bolt 612 engaged within the undercut section 664, it is protected against displacement out of the borehole.

Another locking bolt 612' is shown in FIG. 7C and initially its outside surface forms a continuous cylinder. The enlarged section 666' at the end of the bolt 612' only develops after the bolt is forced against the bottom of the blind borehole 614. The leading end of the bolt, that is the end first inserted into the borehole, is provided with a cone-like recess 668. The recess 668 affords a material weakening of the bolt so that a plastic deformation of the leading cone edge occurs radially outwardly when the locking bolt 612' is driven into the borehole. The enlarged section 666' shown in dashed lines in FIG. 7C fills the undercut section 664 in the base of the borehole. Due to the outward displacement of the section 666' the length of the bolt 612' is reduced when it is driven into the borehole 614 and the reduction in length is indicated by the trailing end face 670 shown in dashed lines in FIG. 7C.

In FIG. 8 another embodiment is shown for securing the locking bolt 712 in place. Locking bolt 712 is inserted into a blind receiving borehole 714 located in the contact plane 722 of the individual nuts 724, 726 of double nut 710. A radially extending threaded bore 772 is provided in the individual nut 726 of the double nut 710 alongside the receiving borehole 714. A securing screw 774 is threaded into the bore 772 and it is provided with a countersunk head 776 which fits into the countersunk portion of the bore 772. While the adjacent sides of the bore 772 and the borehole 714 are spaced apart, the countersunk head 776 extends outwardly so that it is located, in part, over the upper or outer end of the borehole 714. The countersunk head 776 when inserted is flush with the outer circumference of the individual nut 726. The frusto-conically shaped underside 778 of the countersunk head 776 contacts the frusto-conically shaped upper end 780 of the locking bolt 712 when the bolt is inserted into the borehole 714. With the countersunk head 776 overlapping and in contact with the frusto-conical upper end 780 of the locking bolt, the locking bolt is secured within the borehole 714 against any undesirable radially outwardly directed movement.

In FIG. 9 double nut 810 is shown with an intermediate ring 842, similar to that shown in FIG. 4, inserted into an internal groove formed in the inside surfaces of the individual nuts 824, 826 of the double nut 810. The intermediate ring 842 bridges the contact plane between the two individual nuts 824, 826. Unlike the embodiment shown in FIG. 4, however, instead of a single locking bolt, two locking bolts 884, 888 are provided each inserted into a separate receiving borehole 882, 886 of the individual nuts 824, 826, respectively. The locking bolts 884, 888 have a shape corresponding to the shape of the locking bolt 312 shown in FIG. 4, that is, each locking bolt has a shoulder at the transition between the threaded section and the cylindrical section so that the shoulder bears against the outer circumferential surface of the intermediate ring 842. With the locking bolts 884, 888 screwed into the holes in the intermediate ring 842 they exert no radial forces on the individual nuts 824, 826.

When the double nut 810 is tightened on the threaded spindle 820 at least one of the receiving boreholes 882, 886 and/or at least one of the threaded holes 846 in the intermediate ring 842 can be formed after the tightening of the double nut has been effected. Since the intermediate ring 842 can be formed from a material which is softer than that of the individual nut 824, 826 it is especially advantageous if only one of the threaded holes 846 is formed subsequently. Further, it is possible to insert one of the two locking bolts 884, 888 into its corresponding receiving borehole 882, 886, respectively and to screw it into the threaded hole 846 before the tightening operation is carried out. Subsequently, the individual nuts 824, 826 can be tightened on the spindle 820. In the desired position of the double nut, the intermediate ring 842 is drilled through one of the receiving boreholes 882, 886 to provide the threaded hole 846 in the intermediate ring. Next, the other locking bolt can be threaded into the newly formed hole to complete the assembly.

In all of the above-described double nut embodiments, all of the receiving boreholes for the locking bolts can be provided during the production of the individual parts, that is, if, because of a specially precise manufacturing, one can assume that the desired prestress is adjusted after turning the two individual nuts to the point where the receiving boreholes or the partial boreholes of the individual nuts are aligned in the contact plane. The prefabrication of all of the receiving boreholes is advisable where the adjusted prestress can vary in an allowable manner over a considerable range.

While specific embodiments of the invention have been shown and described in detail to illustrate the application of the inventive principles, it will be understood that the invention may be embodied otherwise without departing from such principles.

We claim:

1. Method of forming a preloaded double-ball nut running on a threaded spindle, said double nut comprising a pair of individual ball nuts running on balls on said threaded spindle, the method including:
    (a) mounting said pair of individual nuts on said balls on said threaded spindle;
    (b) rotating one of said individual nuts relative to the other such that a desired preload is obtained, said preload pressing said individual nuts together, said individual nuts being in mutual contact in a contact plane;
    (c) drilling a radially extending recess in the contact plane said recess extending in both of said preloaded individual nuts;
    (d) inserting a locking member into said recess whereby said locking member secures said individual nuts under said preload and against rotation of one of said individual nuts relative to the other.

2. Method, as set forth in claim 1, including the step of forming the recess by drilling radially inwardly from the exterior of the double nut.

3. Method, as set forth in claim 2, including the step of forming a thread within the drilled recess.

4. Method, as set forth in claim 2, including providing the recess with a diameter slightly greater than the diameter of the locking member and cementing the locking member within the recess.

5. Method, as set forth in claim 4, including forming an annular undercut section circling the axis of the recess intermediate the ends thereof and forming a corresponding annular groove in the surface of the locking member, aligning the undercut section and the annular groove opposite one another and filling cement into the undercut section and the annular groove for locking the locking member within the recess.

6. Method of forming a preloaded double-ball nut running on an axially extending threaded spindle, said double nut comprising a pair of individual ball nuts running on balls on said threaded spindle, the method including:
    (a) mounting said pair of individual nuts on said balls on said threaded spindle;
    (b) rotating one of said individual nuts relative to the other such that a desired preload is obtained, said preload pressing said individual nuts together, said individual nuts being in mutual contact in a contact plane extending perpendicularly of the axis of the threaded spindle;
    (c) after rotating said individual nuts into the desired preload, drilling, relative to the axis of the threaded spindle, a radially extending recess in the contact plane with the axis of said recess extending in the contact plane and with the recess being formed in both of said individual nuts;
    (d) inserting a locking member into said recess whereby said locking member secures said individual nuts under said preload and against rotation of one of said individual nuts relative to the other.

7. Method, as set forth in claim 6 including the step of drilling the recess radially inwardly from the exterior of the double nut.

8. Method, as set forth in claim 6, including forming the recess with a diameter slightly greater than the diameter of the locking member and cementing the locking member within the recess.

9. Method, as set forth in claim 8, including forming an annular undercut section circling the axis of the recess intermediate the ends thereof and forming a corresponding annular groove in the surface of the locking member, aligning the undercut section and the annular groove opposite one another and filling cement into the undercut section and the annular groove for locking the locking member within the recess.

10. Method, as set forth in claim 6, including the step of drilling the recess in the contact plane so that the recess is evenly divided within each of the individual nuts.

* * * * *